United States Patent Office 3,147,407

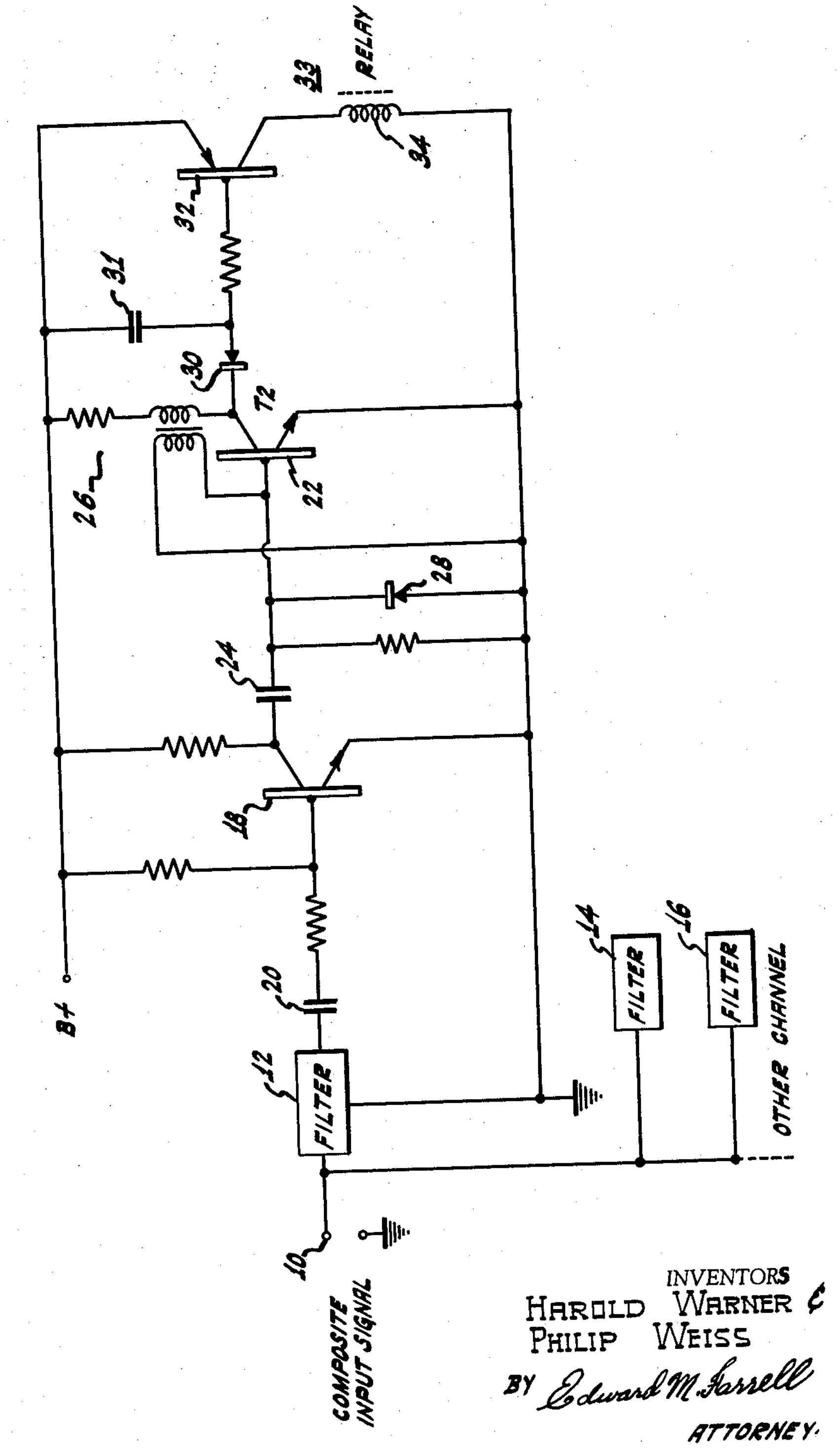
INVENTORS
HAROLD WARNER &
PHILIP WEISS
BY Edward M. Farrell
ATTORNEY.

Patented Sept. 1, 1964

3,147,407

POSITIVE ACTION RELAY CONTROL CIRCUIT INCORPORATING A BLOCKING OSCILLATOR

Harold Warner, Holmes, Pa., and Philip Weiss, Brooklyn, N.Y., assignors, by mesne assignments, to American Bosch Arma Corporation, Hempstead, N.Y., a corporation of New York Filed Oct. 10, 1958, Ser. No. 766,634

3 Claims. (Cl. 317—146)

This invention relates to relay control circuits, and more particularly to relay control circuits associated with decoders.

In many systems, especially in guidance systems involving the control of missiles or "drones" (pilotless aircraft), a plurality of channels within a predetermined frequency band is used to control various functions in the craft.

For example, a typical ten or 20-channel remote control guidance system may require the simultaneous operation of up to six tone signals to select one or more of a plurality of functions to be controlled. In such systems, it is desirable to utilize the full carrier deviation characteristics of the transmitter regardless of the number of tones used. A compressor circuit is often utilized at the transmitter to allow full carrier deviation regardless of whether a single tone or all six tones are applied thereto. In such cases, when the composite audio tone signal is applied to a decoder, which is generally in an airborne receiving station, the output signal to the decoder for a single tone will be six times greater (16 db) in amplitude than the output signal to the same decoder when six tones are utilized to modulate the carrier signal.

In such systems involving the transmission of a plurality of tones or subcarrier signals, cross talk and harmonic content become serious problems, and subcarrier or tone signals of one channel tend to interfere with the normal operation of adjacent channels. Drifts in temperature and variations in power supplies tend to produce changes in signal amplitude applied to the decoder. Temperature and power supply variations may also cause drifts in the frequency of the tone oscillators in the transmitter and in the bandpass characteristics of the filter in each decoder.

All of the above factors must be considered in designing decoding equipment. The 16 db range in signal amplitude, which has been shown above to be inherent in many systems, requires that the bandpass filter associated with each decoder have better than 16 db of adjacent channel rejection for this purpose above. Consider then the additional rejection which is required due to the poor hysteresis of the average relay. This hysteresis may be as high as 16 db in the environments within which decoder units may be operated. Hysteresis of a relay is here defined as the ratio in db of the "pull-in" current to the "drop-out" current. Poor hysteresis in relays also causes the relay to be "held in," after a normal closure has been cancelled, by the cross talk and harmonic content passed by the filter. In the past as a result of these considerations, the ultimate design of the equipment has required the use of relay devices of extremely close hysteresis tolerance. The use of low cost standard type relays which are readily available commercially in large quantities has been limited.

In many cases involving decoder circuits, a relay device is adapted to become operative when a tone signal transmitted within a carrier to an airborne vehicle or the like is received, demodulated, and passed by the aforementioned bandpass filter. It is necessary that this relay be inoperative when no tone signal is transmitted in its associated channel and to become inoperative when an incoming signal drops below a predetermined threshold. A positive on and off or "snap" action of the relay device involved is required in order to assure proper functioning of the decoding circuit which may be associated, for example, with a missile or programing operation.

It is an object of this invention to provide an improved relay control circuit which minimizes the on-off hysteresis inherent in a relay.

It is a further object of this invention to provide an improved decoder circuit wherein a relay associated with one channel is substantially unaffected by signals from adjacent channels.

It is still a further object of this invention to provide an improved decoder circuit wherein a relay associated with one channel is substantially unaffected by signals from adjacent channels while making use of bandpass filters with nominal, realistic adjacent channel rejection.

It is still a further object of this invention to provide an improved relay control circuit which is temperature compensated.

It is still a further object of this invention to provide an improved relay control circuit wherein the type of relays employed is not critical.

In accordance with the present invention, a control circuit for a relay is provided. A blocking oscillator produces a relatively constant level signal when triggered by a signal, representative of a tone signal exceeding a predetermined threshold level. The "all or none" signal from the blocking oscillator is applied to a suitable circuit which controls the operation of the relay. A transistor circuit provides a threshold level control. A signal output from a bandpass filter circuit is applied to the transistor circuit to operate the relay when the threshold level is exceeded. A positive action of the relay is achieved only when a signal of a predetermined amplitude from an associated channel is received.

Other objects and advantages of the present invention will be apparent and suggest themselves to those skilled in the art from a reading of the following specification and claims in conjunction with the accompanying drawing, in which the sole figure of the drawing is a schematic diagram illustrating one form of the present invention.

Referring particularly to the drawing, a composite input signal is applied between a terminal 10 and ground to a plurality of filters 12, 14 and 16. Composite signals may comprise a plurality of subcarrier or tone signals. These tone signals may be utilized by means of the decoder circuits to control selective functions in a receiving station. Each of the filters 12, 14 and 16 permits a single tone to pass therethrough while rejecting the tones of the other channels. The number of filters may be greater than the number shown and is dependent upon the number of channels employed in a system, generally a maximum of twenty. The circuitry following the filters 14 and 16, as well as others which may be used, may be substantially similar to that circuitry illustrated which follows the filter 12.

An output tone signal from the filter 12 is applied to the base of a transistor 18 through a coupling capacitor 20. The transistor 18 acts as a clipper amplifier. The amplifier provides a threshold level control circuit for establishing any desired operating point or threshold level which may be dependent upon the circuit parameters employed. If desired, the resistor connected in the collector circuit of the transistor 18 may be made variable to provide a variable sensitivity or threshold level control.

The output signal from the transistor 18 is applied to a transistor 22 through a coupling capacitor 24. The transistor 22 includes a transformer 26 which is connected to provide a blocking type oscillator when the transistor 22 is conducting. The transistor 22 is normally cutoff. However, when pulses from the transistor 18, representing the transmitted tone signals from the filter 12 is applied in sufficient amplitude thereto, the transistor 22 becomes conductive. The transformer 26 provides a form of regenerative feedback to produce operating signals. Once the blocking oscillator has been triggered, its pulse width, amplitude and repetition rate for one operation is self-determined, and it is not ready to be triggered again until its decay time is over. The blocking oscillator may therefore be considered as a source of relatively constant amplitude signals. This period of operation is much larger than the period of the incoming pulses and therefore the period of the blocking oscillator is relatively independent of incoming frequencies. The theory relating to blocking oscillators is well known to those skilled in the art and is therefore not described in detail.

A diode 28 is connected to prevent negative pulses from being applied to the base circuit of the transistor 22.

The output signal from the blocking oscillator is rectified by a diode 30, integrated by a capacitor 31, and applied to the base of the transistor 32. The transistor 32 is normally non-conducting and is bottomed or reaches saturation when the rectified standardized blocking oscillator signal is applied thereto. The term "bottomed" as used in transistors is considered to be the equivalent of the term "saturation" as commonly used in connection with vacuum tubes. A relay 33 includes a coil 34 which is connected in the collector circuit of the transistor 32. A positive action of the relay 34 is obtained when the transistor 32 is bottomed. In the absence of this signal, as when the signal to the blocking oscillator decays below the critical threshold, the relay 34 snaps to an "off" position since the transistor 32 immediately becomes non-conducting.

It is noted that the signal utilized to control the relay transistor 32 is of substantially the same value once triggering of the blocking oscillator has occurred, regardless of the amplitude of the incoming tone signal or the frequency thereof. Thus, it is not necessary that relays of tight characteristics be employed, thereby greatly simplifying design problems associated with decoder systems. Standard types of relays may be used in a plurality of different types of decoder circuits.

The blocking oscillator is a temperature sensitive device. As the temperature increases, the oscillator becomes easier to trigger and its operating point moves down. For this reason, the compensating action of the amplifier including the transistor 18 was employed. Thus the transistor 18 is associated with the function of threshold level control as well as for temperature compensation. The transistor 18 is normally in its saturated state. The incoming signal from the filter 12 turns the transistor 18 off during the negative excursion. This produces a rectified positive pulse. If the temperature goes up, the transistor 18 is more heavily saturated and the incoming signal from the filter 12 will not turn the transistor 18 as far off. This results in smaller output pulses with an increase in temperature. Values of components may be chosen so that output pulses from the transistor 18 will decrease at the same rate as the blocking oscillator triggering level decreases. This in effect provides temperature compensation which is another feature of the present invention.

What is claimed is:

1. A control circuit comprising a relay, a transistor associated with said relay normally non-conductive and adapted to become conductive to operate said relay when a signal of a predetermined amplitude is applied thereto, a blocking oscillator for providing constant amplitude signals sufficient in amplitude to trigger said transistor to a conductive state, said signal being below said predetermined amplitude when said blocking oscillator is inoperative, a threshold level control circuit, means for applying a variable amplitude signal to said threshold level control circuit, means for applying the output signal from said threshold level control circuit to trigger said blocking oscillator into operation, means for rectifying the output signal from said blocking oscillator, means for applying the rectified signal from said rectifying means to said transistor to operate said relay when said variable amplitude signal exceeds said threshold level and to maintain said relay inoperative when said variable amplitude signal is below said threshold level.

2. A control circuit comprising a relay, a first transistor associated with said relay normally non-conductive and adapted to become conductive to operate said relay when a signal of a predetermined amplitude is applied thereto, a blocking oscillator for providing constant amplitude signals sufficient in amplitude to trigger said transistor to a conductive state, said signal being below said predetermined amplitude when said blocking oscillator is inoperative, a threshold level control circuit including a second transistor, means for applying a variable amplitude signal to said threshold level control circuit, means for applying the output signal from said threshold level control circuit to trigger said blocking oscillator into operation, means for rectifying the output signal from said blocking oscillator, means for applying the rectified signal from said rectifying means to said transistor to operate said relay when said variable amplitude signal exceeds said threshold level and to render said relay inoperative when said variable amplitude signal falls below said threshold level.

3. A control circuit in accordance with claim 2 wherein said second transistor also provides a temperature compensation circuit for maintaining a relatively fixed triggering level for said blocking oscillator for different temperatures.

References Cited in the file of this patent

UNITED STATES PATENTS

| | | |
|---|---|---|
| 2,773,219 | Aron | Dec. 4, 1956 |
| 2,807,757 | Callinan | Sept. 24, 1957 |
| 2,879,456 | Pinckaers | Mar. 24, 1959 |
| 2,898,557 | Dahlin | Aug. 4, 1959 |
| 2,955,213 | Schaeve | Oct. 4, 1960 |
| 2,981,898 | St. John | Apr. 25, 1961 |